(12) United States Patent
Mutahi et al.

(10) Patent No.: US 11,497,156 B2
(45) Date of Patent: Nov. 15, 2022

(54) FARM CULTIVATION QUALITY

(71) Applicant: International Business Machines Corporation, Armonk, NY (US)

(72) Inventors: Juliet Mutahi, Ecully (FR); David W. Kaguma, Nairobi (KE); Samuel Maina Karumba, Nairobi (KE); Nelson Kibichii Bore, Nairobi (KE); Percival Silva de Lucena, Valinhos (BR); Andrew Kinai, Nairobi (KE); Komminist Weldemariam, Ottawa (CA); Peninah M. Waweru, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 532 days.

(21) Appl. No.: 16/565,457

(22) Filed: Sep. 9, 2019

(65) Prior Publication Data

US 2021/0068334 A1    Mar. 11, 2021

(51) Int. Cl.
*A01B 79/00*    (2006.01)
*B60W 40/09*    (2012.01)
(Continued)

(52) U.S. Cl.
CPC .......... *A01B 79/005* (2013.01); *B60W 40/09* (2013.01); *G06F 16/951* (2019.01);
(Continued)

(58) Field of Classification Search
CPC .... A01B 79/005; G06N 20/00; G06F 16/951; G06F 40/205; G06F 40/44; B60W 40/09; B60W 2050/0051; G07C 5/085
(Continued)

(56) References Cited

U.S. PATENT DOCUMENTS

| 4,015,366 A * | 4/1977 | Hall, III ................... A01G 3/04 |
| | | 193/25 E |
| 7,930,263 B2 | 4/2011 | Jagannathan |
| | (Continued) | |

FOREIGN PATENT DOCUMENTS

WO    WO2015081335 A2    6/2015

OTHER PUBLICATIONS

Peter Mell, et al. "The NIST Definition of Cloud Computing," NIST, Sep. 2011, p. 1-7.
(Continued)

*Primary Examiner* — Gertrude Arthur Jeanglaude
(74) *Attorney, Agent, or Firm* — Shimon Benjamin; Otterstedt & Kammer PLLC

(57) ABSTRACT

A memory embodies instructions, and a processor is coupled to the memory and is operative by the instructions to facilitate: accessing a source of information regarding farm cultivation techniques; constructing a cultivation knowledge graph by parsing the source of information regarding farm cultivation techniques, using natural language processing; identifying cultivation quality assessment factors by applying machine learning to the cultivation knowledge graph; estimating quality of a farm cultivation task by comparing a stream of real-time data to the cultivation quality assessment factors, wherein the stream of real-time data is related to performance of the farm cultivation task; identifying from the stream of real-time data, using the cultivation knowledge graph, a controllable variable that affects the quality of the farm cultivation task; and improving the quality of the farm cultivation task by facilitating a change in the controllable variable. The controllable variable may be the identity of a tractor operator.

20 Claims, 10 Drawing Sheets

(51) Int. Cl.
*G07C 5/08* (2006.01)
*G06F 16/951* (2019.01)
*G06N 20/00* (2019.01)
*G06F 40/44* (2020.01)
*G06F 40/205* (2020.01)
*B60W 50/00* (2006.01)

(52) U.S. Cl.
CPC ............ *G06F 40/205* (2020.01); *G06F 40/44* (2020.01); *G06N 20/00* (2019.01); *G07C 5/085* (2013.01); *B60W 2050/0051* (2013.01)

(58) Field of Classification Search
USPC .......................................................... 701/50
See application file for complete search history.

(56) References Cited

U.S. PATENT DOCUMENTS

| | | | |
|---|---|---|---|
| 8,170,979 | B2 | 5/2012 | Rinearson |
| 8,639,704 | B2 | 1/2014 | Yerli |
| 9,892,573 | B1 | 2/2018 | Hsu-Hoffman et al. |
| 10,028,426 | B2 | 7/2018 | Schildroth et al. |
| 2005/0180664 | A1* | 8/2005 | Yamada ................ B65D 33/01 383/102 |
| 2010/0325014 | A1 | 12/2010 | Widjojo et al. |
| 2012/0239608 | A1 | 9/2012 | Rinearson |
| 2014/0258034 | A1 | 9/2014 | Ratterman et al. |
| 2015/0199775 | A1 | 7/2015 | Pfeiffer et al. |
| 2016/0232475 | A1 | 8/2016 | Kuehnle et al. |
| 2017/0032473 | A1 | 2/2017 | Koch et al. |
| 2017/0139380 | A1 | 5/2017 | Englard et al. |

OTHER PUBLICATIONS

Dr. John E. Kelly III, "Computing, cognition and the future of knowing," IBM, Oct. 2015, p. 1-7.

Dimitri Kartsaklis, et al. "Mapping Text to Knowledge Graph Entities using Multi-Sense LSTMs," Proceedings of the 2018 Conference on Empirical Methods in Natural Language Processing, Oct. 2018, p. 1959-1970.

Hatem Mousselly-Sergieh, et al., "A Multimodal Translation-Based Approach for Knowledge Graph Representation Learning," Proceedings of the 7th Joint Conference on Lexical and Computational Semantics, Jun. 2018, p. 225-234.

Xander Wilcke, et al. "The knowledge graph as the default data model for learning on heterogeneous knowledge," Data Science, vol. 1, No. 1-2, Dec. 2017, p. 39-57.

Jiaxuan You, et al. "GraphRNN: Generating Realistic Graphs with Deep Auto-regressive Models," arXiv:1802.08773v3, Jun. 2018, p. 1-12.

* cited by examiner

FARM CULTIVATION QUALITY

BACKGROUND

The present invention relates to the agricultural arts, and more specifically, to the cultivation of farmland.

Tractors provide a range of cultivation/farming services such as ploughing, deep ripping, harrowing, fertilizer spreading, seeding and so on. For each of these service types, associated equipment or tools may be attached to the tractors. Modern tractors also come with very sophisticated on-tractor-built equipment/tools each with sophisticated internet-of-things (IoT) capabilities to sense, learn and administer farm level activities while helping operators of the tractors in real-time.

Cultivation quality is linked to crop growth and hence yield productivity. For example, crop roots grow deeper and more quickly into soil that has been "deep ripped" by tractor-towed tines. Root growth is important for plants to obtain moisture and nutrients from the soil for enhanced crop growth. Therefore, when tractors are used on farms, their operations should be done with great care.

Quality of cultivation operations depends on or is affected by a number of factors such as soil type, structure and condition, topography, weather/climate, user input (crop types, planting dates), etc. Relevant factors and their impact are explained in various documents such as scientific articles, websites, machinery/product owner manuals, etc.

Operators of tractors also play a pertinent role on the overall quality of the cultivation and hence on the overall productivity of farms. For example, deep ripping mechanically breaks up compacted soil layers by using strong tines working down to approximate 35-50 cm depth to loosen hard layers of soil. Tine spacing, working depth, use of shallow leading tines or discs, soil moisture content, timing and soil type all should to be considered. Some of these parameters are controllable by a tractor operator who is well-trained with some level of agronomic knowledge.

Accordingly, farmers would like to know (and be able to choose) the experience level and/or effectiveness of operators for a given tractor service type.

SUMMARY

Principles of the invention provide techniques for improving farm cultivation quality. In one aspect, an exemplary method includes accessing a source of information regarding farm cultivation techniques; constructing a cultivation knowledge graph by parsing the source of information regarding farm cultivation techniques, using natural language processing; identifying cultivation quality assessment factors by applying machine learning to the cultivation knowledge graph; estimating quality of a farm cultivation task by comparing a stream of real-time data to the cultivation quality assessment factors, wherein the stream of real-time data is related to performance of the farm cultivation task; identifying from the stream of real-time data, using the cultivation knowledge graph, a controllable variable that affects the quality of the farm cultivation task; and improving the quality of the farm cultivation task by facilitating a change in the controllable variable that affects the quality of the farm cultivation task.

One or more embodiments of the invention or elements thereof can be implemented in the form of a computer program product including a computer readable storage medium with computer usable program code for facilitating the method steps indicated. Furthermore, one or more embodiments of the invention or elements thereof can be implemented in the form of a system (or apparatus) including a memory that embodies computer executable instructions, and at least one processor that is coupled to the memory and operative by the instructions to facilitate exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a tangible computer readable storage medium (or multiple such media) and implemented on a hardware processor, or (iii) a combination of (i) and (ii); any of (i)-(iii) implement the specific techniques set forth herein.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

In view of the foregoing, techniques of the present invention can provide substantial beneficial technical effects. For example, one or more embodiments provide one or more of:

Efficient utilization of farm cultivation equipment.
Enhanced effectiveness of farm cultivation techniques.
Selection of optimal farm cultivation strategies.
Constructing a knowledge graph for farm cultivation quality assessment.
Estimating farm cultivation quality to maximize farm productivity.

These and other features and advantages of the present invention will become apparent from the following detailed description of illustrative embodiments thereof, which is to be read in connection with the accompanying drawings.

DETAILED DESCRIPTION

Figure 1:
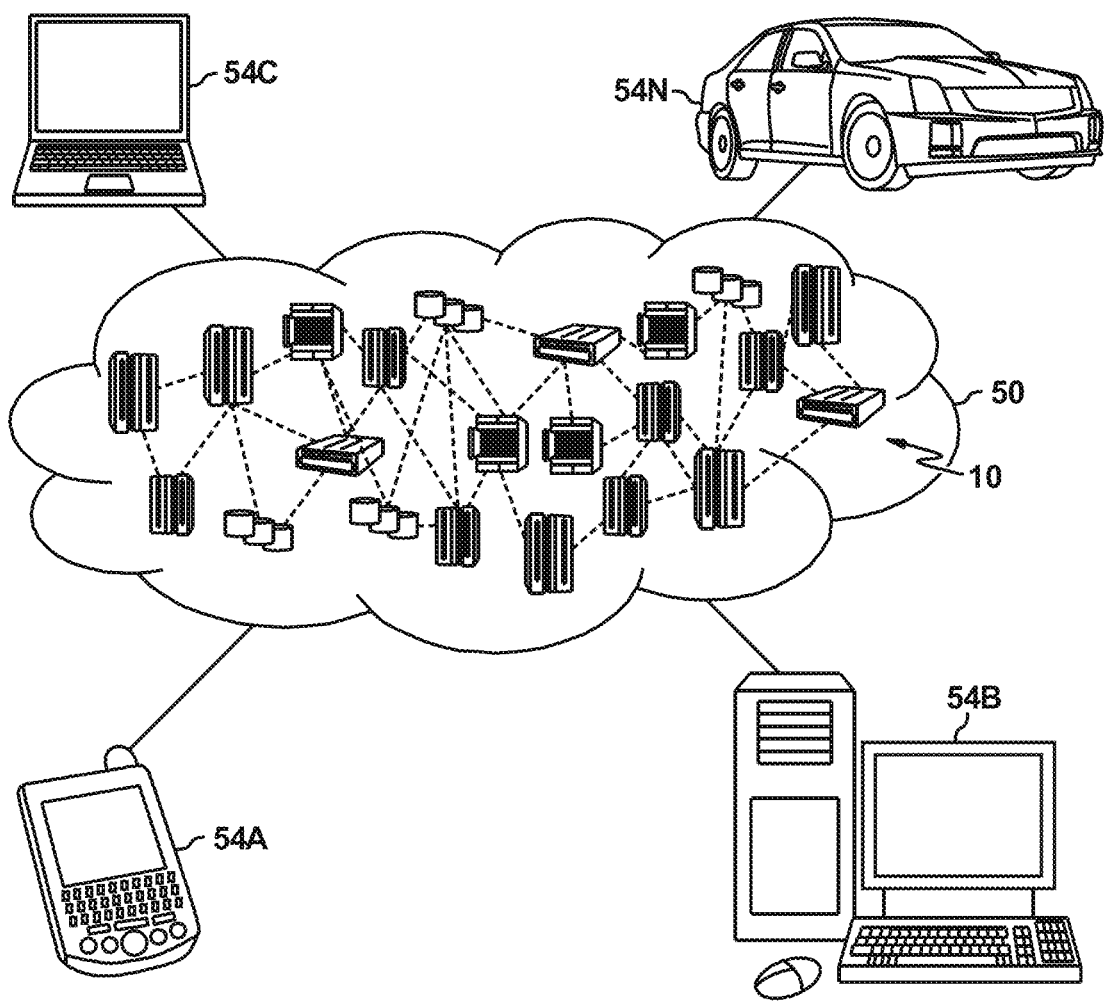
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
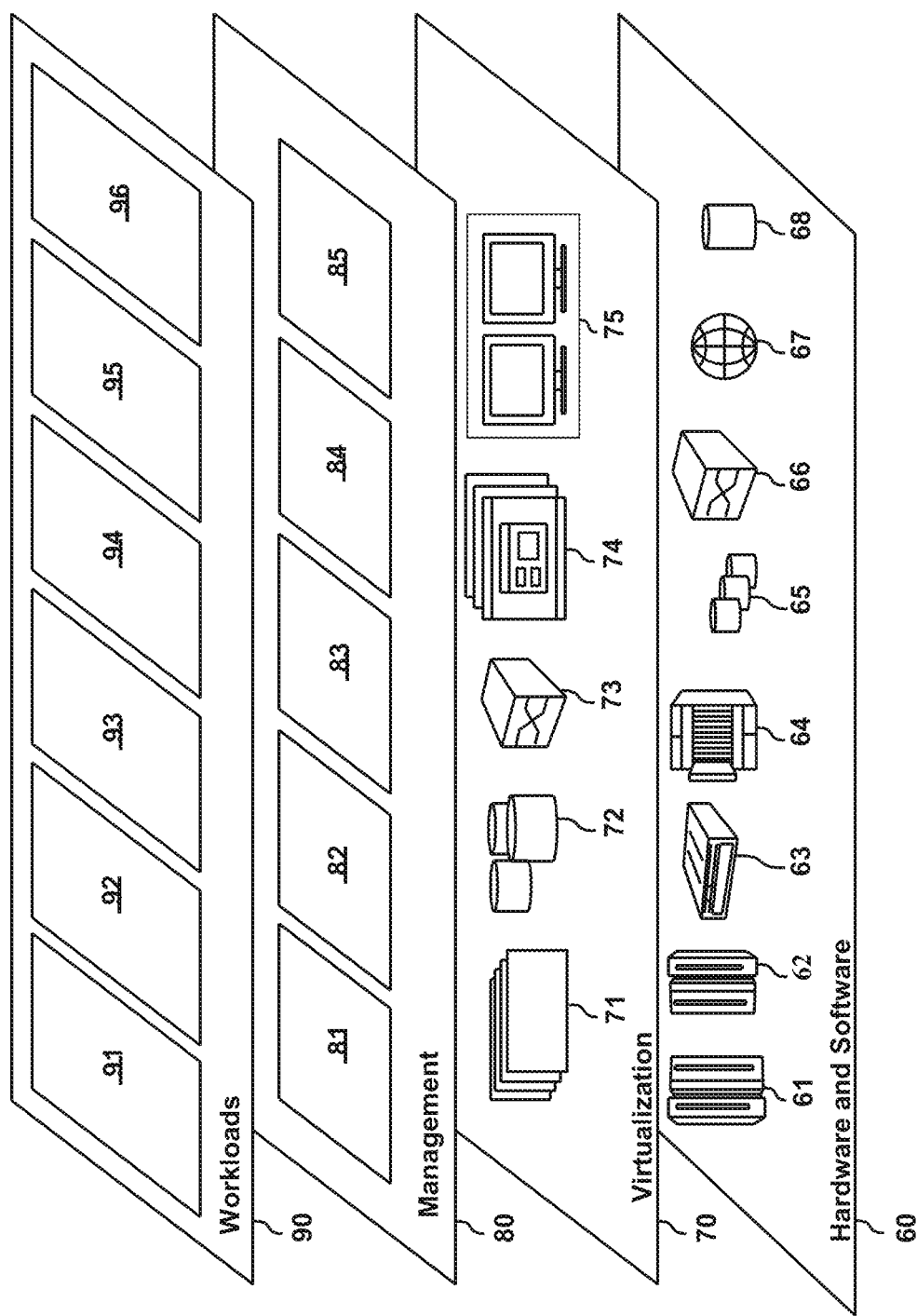
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a digital farm monitoring and decision support environment (DFMDSE) 96.

One or more embodiments of the invention include constructing cultivation knowledge graphs/models (CKG) from a plurality of farming data sources, and then, for each tractor service type t on a farm F: identifying cultivation "quality" assessment factors from the CKG; analyzing stream(s) of data received from a plurality of data sources in real-time (e.g., data from an IoT-enabled tractor, satellite data, data from a low-cost camera that may be attached to a tractor, weather forecast, etc.); and estimating the quality of cultivation for the farm F based on the analyzed stream(s) of data, cultivation quality assessment factors, and analysis of profiles related to the farm, operator, and tractor.

Figure 3:
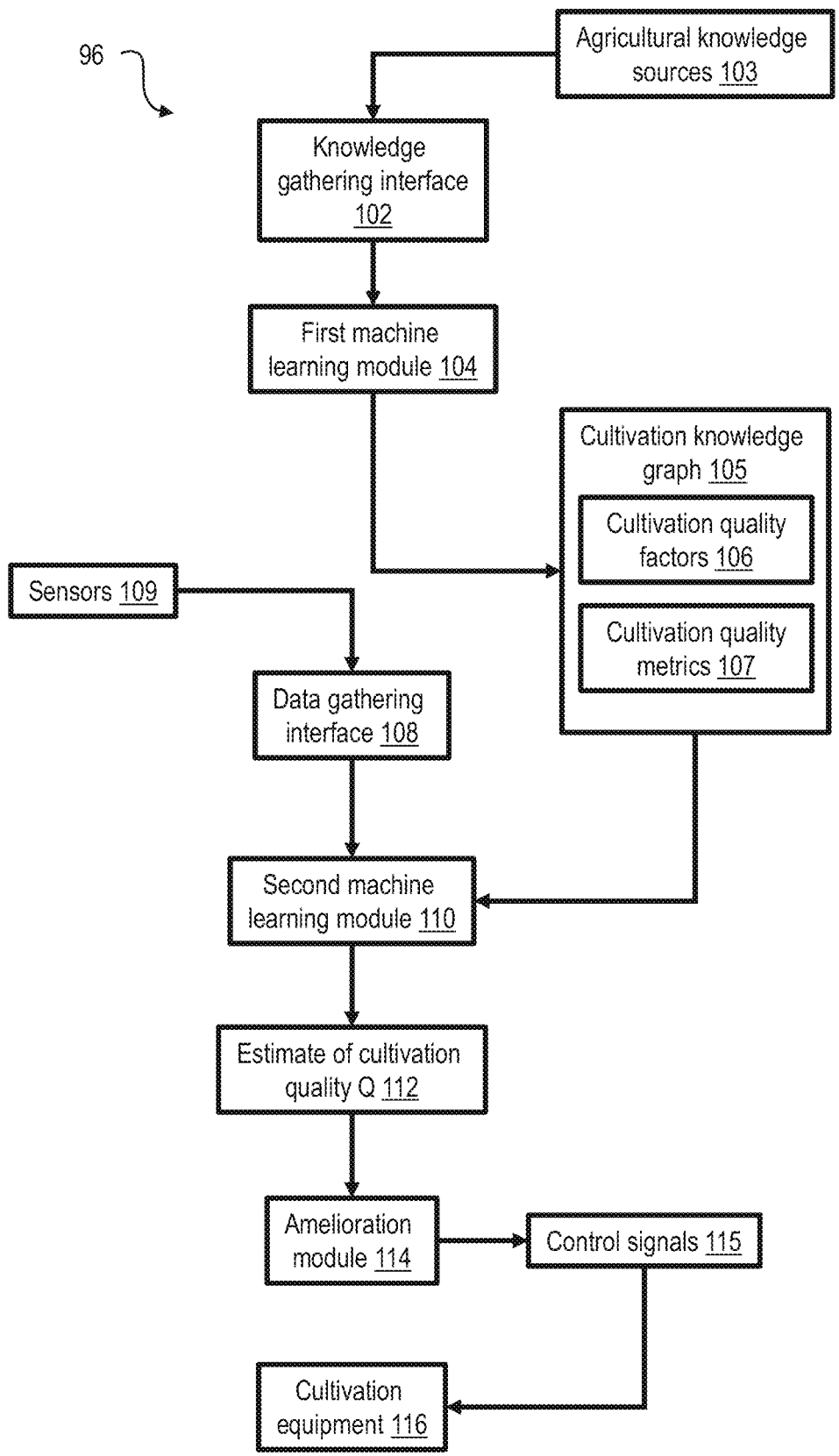
FIG. 3 depicts in a schematic a digital farm monitoring and decision support environment, according to an exemplary embodiment.

FIG. 3 depicts in a schematic the digital farm monitoring and decision support environment (DFMDSE) 96, according to an exemplary embodiment. The DFMDSE 96 includes a knowledge gathering interface 102 that accesses one or more agricultural knowledge sources 103, i.e. scholarly articles, webpages identified by curation or by natural language processing techniques, farm equipment manuals, and the like. The DMFDSE 96 also includes a first machine learning module 104 that applies natural language processing to the agricultural knowledge sources 103 to generate a cultivation knowledge graph (CKG) 105 that includes cultivation quality factors 106 and cultivation quality metrics 107. The DFMDSE 96 also includes a data gathering interface 108 that accesses real-time data streamed from one or more sensors 109 that are associated with a farm and/or an item of cultivation equipment. Another component of the DFMDSE 96 is a second machine learning module 110 that integrates the real-time data from the sensors 109 with the CKG 105 and produces an estimate 112 of cultivation quality as a function of predicted crop yield variance from a predicted baseline without cultivation. The system can construct a catalogue of "farm implications" across a plurality of tractor service types, with farm profiles assigned to multiple "farm implications" based on their current and predicted farm yield and outcomes surrounding these specific farm implications. This is done by constructing cultivation knowledge graphs (CKGs) or models.

Figure 4:
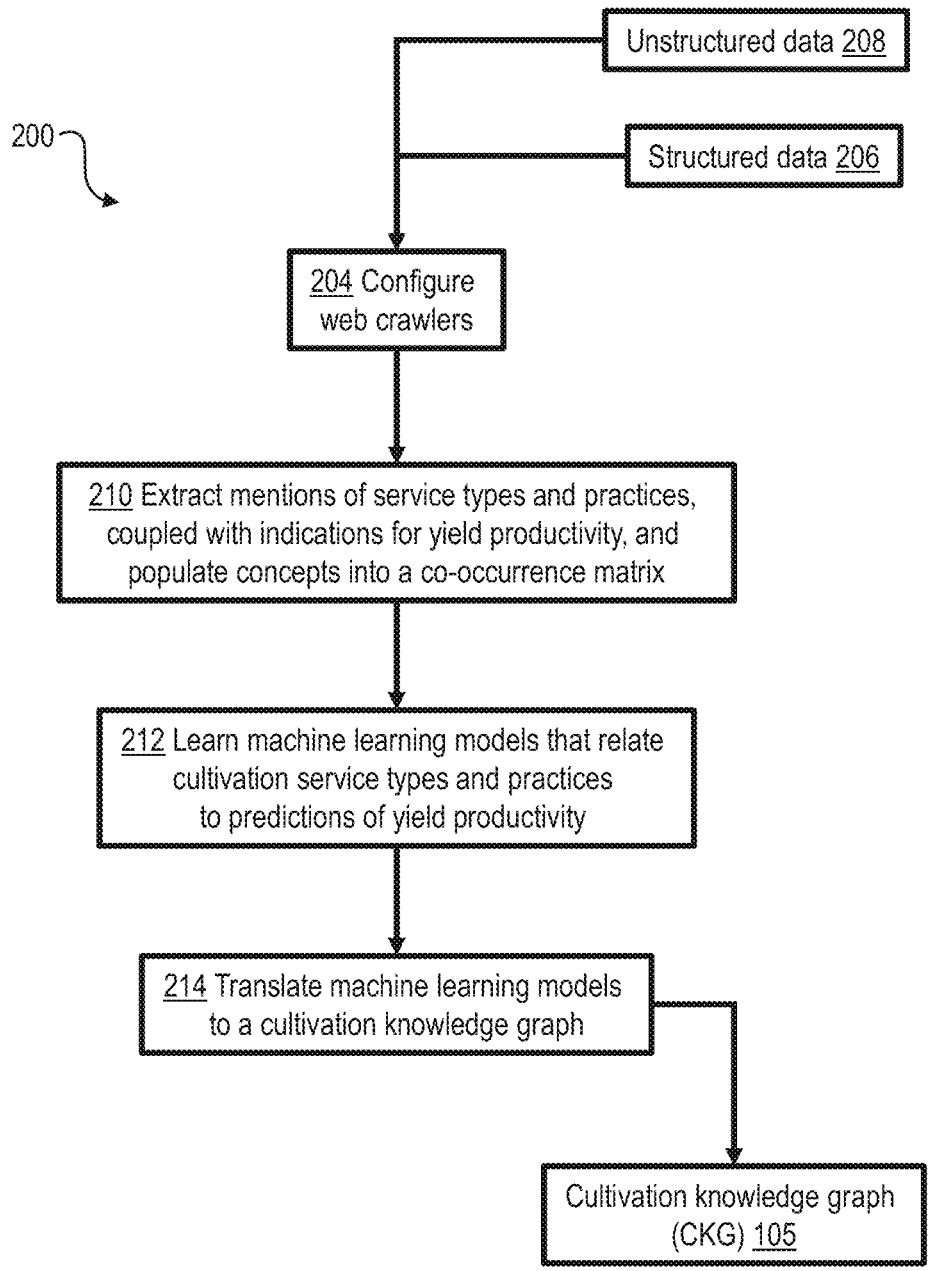
FIG. 4 depicts a flowchart illustrating a method for constructing cultivation knowledge graph according to an exemplary embodiment.

FIG. 4 depicts in a flowchart a method 200 for constructing a CKG 105. The method 200 combines data mining techniques with extensive manual curation by a panel of experts. The method 200 first includes, at 204, configuring web crawlers to collect, extract and prepare farming related data sources from structured and unstructured data. By way of examples, structured data 206 may include farming operator related documents (e.g., agricultural or agronomical textbooks, journals). Unstructured data may include various trusted web contents 208. Trust in web contents can be established first by manual curation, then optionally by machine learning based on the manual curation (i.e., supervised machine learning to apply a label of "trustworthy" with varying confidence based on natural language processing using, e.g., a recurrent neural network). The plurality of farming related data sources can include, for example, best farm management practices, guidelines or regulations about each of tractor service types (e.g., ploughing, deep ripping, harrow, fertilizer spreader, and so on), soil profile (e.g., type, moisture, nutrition/chemical contents, fertilizers), historic estimated cultivation quality values across cohort of farms, and so on.

The method 200 then includes, at 210, extracting mentions of service types and practices (concepts), coupled with possible (negative) indications for a yield productivity, and populating the concepts into a co-occurrence matrix. At 212, learn machine learning models (MLMs) that relate cultivation service types and practices to predictions of yield productivity. At 214, translate the learned MLMs into a CKG. In one or more embodiments, for each MLM, a weight measure is constructed to determine whether an edge should be included in the CKG between cultivation qualities of each service type and "best" practices ("quality metrics"). The weight measures indicate each model's relative confidence that an edge exists between a pair of nodes. In one embodiment, the cultivation qualities of each service type for each "best" practice ("quality metric") are then sorted by the weight measure. For example, the weight measure for logistic regression can be Max($w_{ij}$, 0), where wij is the weight associated with service type $t_i$ in the logistic regression model fit to predict quality metric j. In other words, if the use of a best practice made an increase in cultivation quality for a given service type t more likely, then a corresponding edge may exist in the graph.

In one or more embodiments, techniques for generating realistic graphs with deep auto-regressive models may be used to generate CKG.

Figure 5:
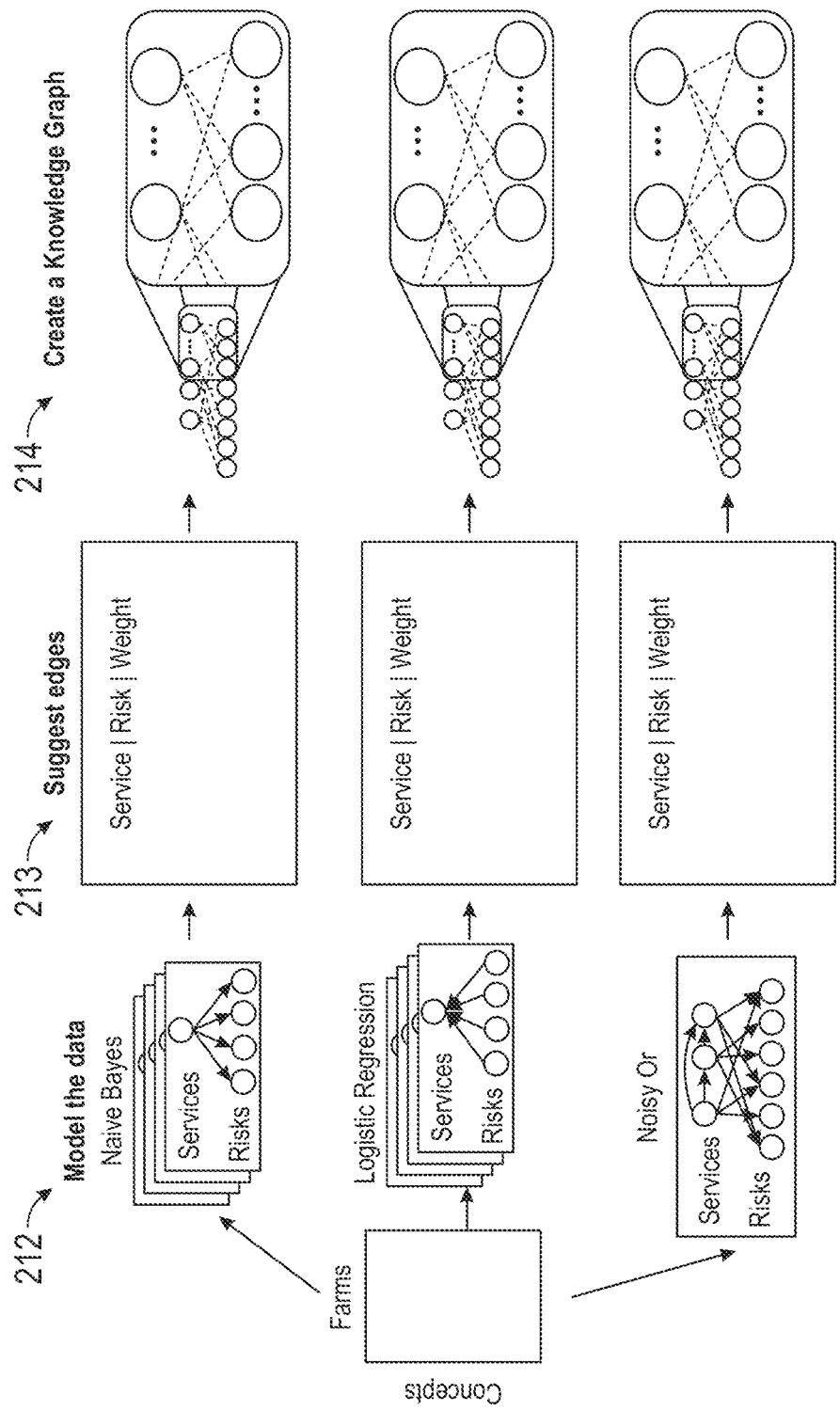
FIG. 5 depicts a schematic illustrating particular steps of the method of FIG. 4.

In one or more embodiments, machine learning models relating tractor service types and practices (concepts) are learned that model relationships between cultivation services and quality metrics by describing the practices of one or more farming operations across a plurality of factors using the extracted concepts. The plurality of factors may include farm profile (e.g., soil type, structure, topology, characteristics, crops, moisture level, etc.), weather conditions (including seasonality models), tractor profile (including types, models and attachments), operators' profiles, and so on. Various machine learning models/algorithms (e.g., natural language processing, Naive Bayes, Logistic regression) may be employed to infer relationships between service types and "best" practices ("quality metrics") from the plurality of data sources. The parameters for each of these machine learning models may be learned using maximum likelihood estimation. With reference to FIG. 5, particular steps of the method 200 include at 212 learning MLMs, at 213 suggesting graph edges based on the MLMs, and at 214 translating the learned MLMs in to CKGs based on the suggested graph edges.

Referring briefly back to FIG. 3, the DFMDSE 96 also includes an amelioration module 114 that compares the estimate of cultivation quality to a threshold effectiveness, generates one or more amelioration actions (adjustments to controllable variables), and implements or otherwise facilitates the amelioration actions by sending control signals 115 to the farm cultivation equipment 116.

Figure 6:
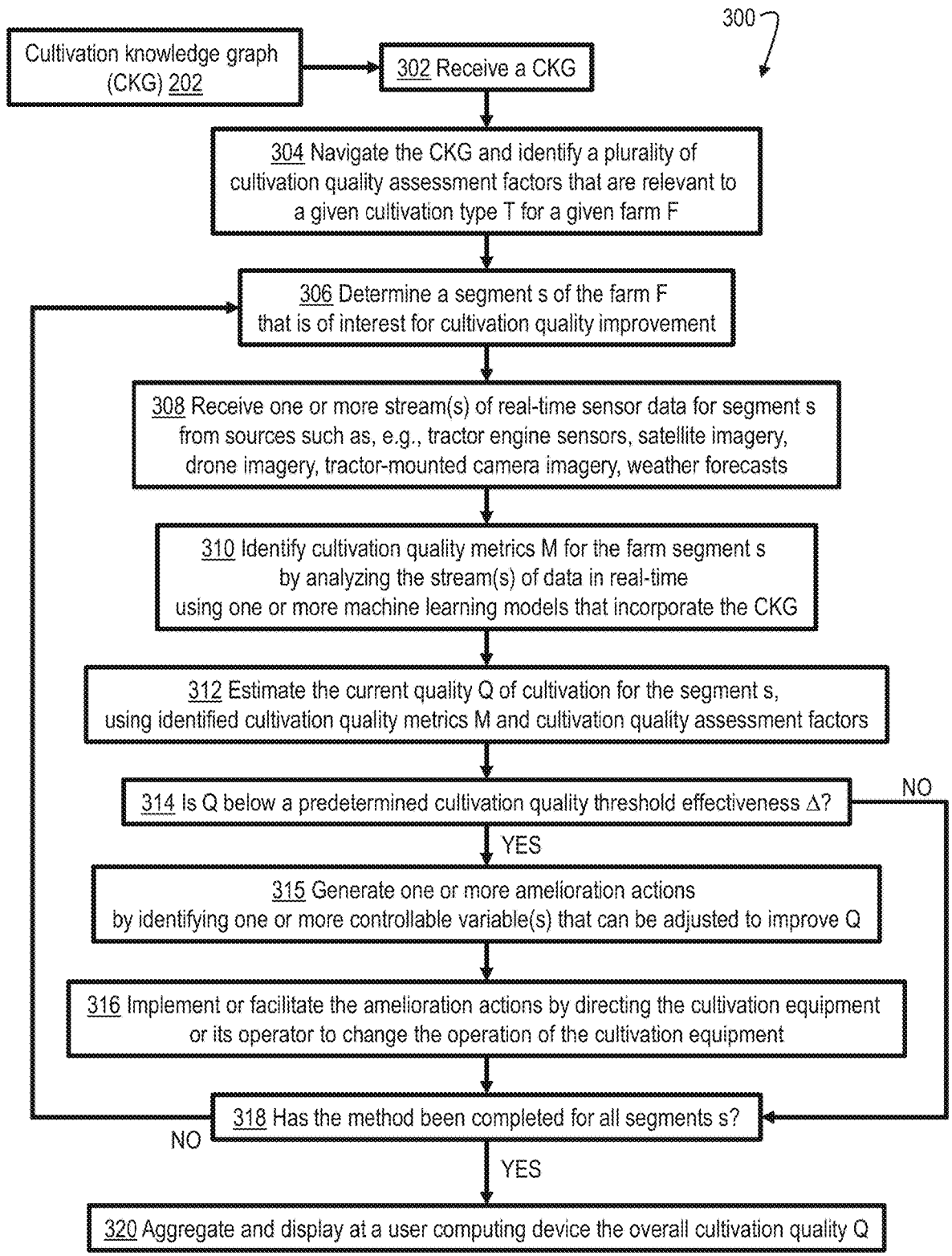
FIG. 6 depicts a flowchart illustrating a method for computing cultivation quality according to an exemplary embodiment.

FIG. 6 depicts another aspect of the invention in the form of an exemplary method 300 for improving farm cultivation quality. At 302, receive a cultivation knowledge graph (CKG) 202. At 304, navigate the knowledge graph (e.g., represented in a decision tree structure) and identify a plurality of cultivation quality assessment factors that are relevant to a given cultivation type T for a given farm F. At 306, determine a segment s of the farm F that is of interest for cultivation quality improvement. At 308, receive one or more stream(s) of real-time sensor data for segment s from sources such as, e.g., tractor engine sensors, satellite imagery, drone imagery, tractor-mounted camera imagery, weather forecasts, and the like. At 310, identify cultivation quality metrics M for the farm segment s by analyzing the stream(s) of data in real-time using one or more machine learning models that incorporate the CKG. In one embodiment, the machine learning models and the CKG may be deployed on an edge device (i.e., on tractor computer, on a user mobile phone, etc.). In one embodiment, the machine learning models and the CKG may be configured to run in offline modes and from time to time they may synchronize with their corresponding cloud hosted deployment to fetch global knowledge on any model or knowledge updates. At 312, estimate the current quality $Q_s$ of cultivation for the segment s, using identified cultivation quality metrics M and cultivation quality assessment factors. At 314, determine whether $Q_s$ is below a predetermined cultivation quality threshold $\Delta$. If so, then at 315 generate one or more amelioration actions by identifying one or more controllable variable(s) that can be adjusted to improve $Q_s$. In one scenario, a value for the predetermined cultivation quality threshold $\Delta$ may be set a panel of experts (e.g., by agronomists). In another scenario, the for the predetermined cultivation quality threshold $\Delta$ may be determined by a machine learning algorithm based on historical performance of the predetermined or simulated values in one or more farms. At 316, implement or otherwise facilitate the amelioration actions by directing the cultivation equipment (e.g., sending a signal to a control unit of an attachment tool to adjust the depth and width of centimeters) or its operator to change the operation of the cultivation equipment. At 318, check whether the method 300 has been completed for all segments s. If not at 306 go to a next segment of the farm F. At 320, if the method 300 has been completed for the entire farm F, aggregate and display at a user computing device (on operator phone, farmer phone, agronomist tablet/smartphone, etc.), and/or on the dashboard of the tractor, the overall cultivation quality $Q=\Sigma_s Q_s$. Essentially, Q is a measure of how closely the tractor operator has managed to approach, or is approaching, target values of the cultivation quality metrics M, where the target values are determined based on the measured farm conditions using the CKG.

Figure 7:
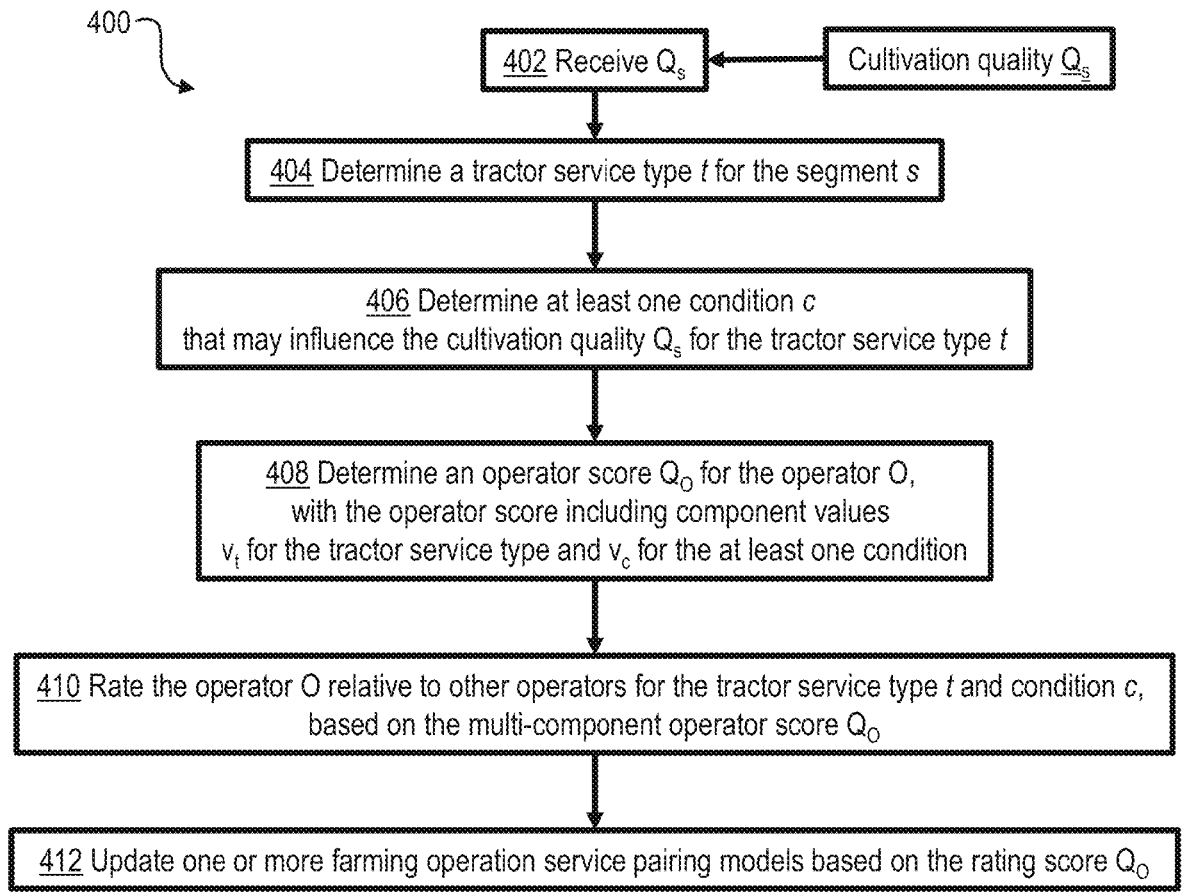
FIG. 7 depicts a flowchart illustrating a method for operator rating according to an exemplary embodiment.

Determining the overall cultivation quality Q can go toward a method 400 for rating the performance of an operator O of a farm tractor in order to enhance farm productivity, as depicted in FIG. 7. The method 400 includes, at 402, receiving the cultivation quality $Q_s$ for a segment s that has been or is being cultivated by the operator O. At 404, determine a tractor service type t for the segment s. At 406, determine at least one condition c that may influence the cultivation quality $Q_s$ for the tractor service type t (e.g., ploughing, deep ripping, harrow, fertilizer spreader).

Thus, for each given service type t (e.g., ploughing, deep ripping, harrow, fertilizer spreader), at 406 determine one or more conditions c that may affect/influence the ratings by a variant of genetic algorithm to rank and select features that are more important for ratings. The one or more conditions are determined from the user profile model, farm profile model, tractor profile model and/or other models generated from other data sources using a variant of machine learning algorithms such as weighted joint entropy indexing (e.g., apply the method for weight calculation based on entropy weight analytic hierarchy process), genetic algorithms, etc.

The method also compares and cross-references identified events and conditions with recommended practices obtained from the CKG 105. For example, based on identified events during plowing service the system can check if the plowed areas of the farm may be likely to damage or kill the microbes in the soil when it is too wet. This information will be used by the scoring module. The system then determines a respective service type value associated with each of the tractor service type. It then determines at least one condition value associated with the at least one condition.

At 408, determine an operator score $S_o$ for the operator O, with the operator score including component values $v_t$ for the tractor service type t and $v_c$ for the at least one condition. In one or more embodiments, $\hat{y}_{score}(w, x)$ indicates the estimated score for an operator:

$$\hat{y}_{score}(w,x)=w_0+w_1 x_{operator\_profile}+w_2 x_{tractor\_profile}+w_3 x_{service\_type}+w_4 x_{farm\_profile}+\ldots$$

where $W=(w_1, w_2, w_3, w_4, \ldots)$ is the vector of coefficients and $x=(x_{operator\_profile}, x_{tractor\_profile}, x_{service\_type}, x_{farm\_profile}, \ldots)$ is the vector of inputs. The input vector includes variables about the operator profile, farm profile, tractor profile, service type profile, etc.

Thus, for each of the operators, step 408 identifies a respective score including respective multi-component values based on the service type values, the first condition value, and the second condition value for the farms for the respective operator. The service type values are based on cultivation history values which, in turn, are based on the estimated quality scores for the operators in one or more farms while operating in the respective service type, while operating under on ore more conditions. In one embodiment, each of the farming operating scores (i.e., tractor driving scores) is also based on the estimated cultivation quality values and a number of events (and event types) that may affect quality of cultivation (e.g., unnecessary back and-forth in a portion of a field, depth and width of the ploughing for example, uniformity of leveling, spraying, etc.). Therefore, the multi-component values are based on the estimated quality scores for the operator while operating in the respective service type in one or more conditions.

In a first illustrative example, a first operator may have a record (e.g., operating history value) of eight (8) quality events in 10000 square meter (1 hectare), or 0.08% (i.e., 8/10000), while cultivating on hilly farms and a record of twelve (12) quality events in 15000 sq. meter (1.5 hectare), or 0.027%, while driving on non-hilly farms. The same operator may have record of two (2) quality events in 5000 sq. meter (0.5 hectare), or 0.080%, while driving in a first service context (i.e., ploughing during dry season) and a record of twenty (20) quality events in 600 sq. meter, or 0.33%, while driving in a second service context (i.e., ploughing wet seasons). In addition, the first operator may have a record of four (4) quality events in 2 hectares, or 0.020% while operating on hilly farms during dry season and a record of twelve (12) quality event in 4 hectares, or 0.03% while cultivating on hilly farms during wet season. Furthermore, the 1st operator may have a record of X quality events in X1 hectare, or X2% (i.e., X2=X/X1) while operating on non-hilly farms during dry season and a record of Y quality event in Y1 hectare, or Y2% (i.e., Y2=Y/Y1) while cultivating on hilly farms during wet season. Therefore, this first operator has the best (lowest) driving score for operating on non-hilly farms during dry season and the worst (highest) score for cultivating on hilly farms during wet season.

At 410, rate the operator O relative to other operators for the tractor service type t, based on the multi-component operator score $S_O$. Thus, for each service type, the system also receives previous estimated quality values for a plurality of farms. Thus, each historical operating score incorporates a number of quality events incurred by an operator for a farm in a respective farm condition (e.g., ploughing on soil types and condition) and context (e.g., ploughing during dry season and wet seasons), etc. The identification of the events and event types is based on analysis of real-time stream data received from a plurality of sources such as IoT devices/sensors (e.g., GPS, accelerometer), satellite, camera, etc. In one embodiment, determining driving behavior of the operator in a given farm further enhances scoring of operators. To compute the operator score, let O represent the set of all operators and B represent the set of all categories of driving behavior. Each occurrence of an operator executing one of the behaviors in B is called a driving behavior event e. In one aspect, a driving behavior event can be modeled using 5-tuple e ∈ E=<o, b, t, l, c>, where:

o: represents a specific operator, where o ∈ O, b: represents a type of driving behavior of an operator, where b ∈ B, t: timestamp of when the event occurred, l: represents the location in the farm F or fram segment s (e.g., GPS), of where the event occurred, and c: represents the operator driving context (defined below).

The set of all driving behavior events E are used and indexed by operator o, behavior type b, and context c, to obtain a particular subset of events. A driving context of an operator is associated with each driving behavior event and describes the situation in which the event occurred. In one aspect, context variables can include weather, time-of-day, modes and attachments of tractors, farm profile, and operator profile. We denote context by C, where $C = C_1 \times C_2 \times C_3 \times \ldots \times C_N$ is the set of n-tuples representing all combinations of context variables that can be associated with an operator driving behavior event. Each $C_i$ is a context variable with its own domain of possible values. The context of an operator driving behavior event, context €=c, is the tuple $c = <v_1, v_2, \ldots, v_n>$, where $v_k$ is the value assignment from the corresponding domain of each variable in the context.

In another aspect, the driver rating score may be computed using $$S = \frac{1}{1 + \sigma_c f_c}$$

where $\sigma^c$ is a factor representing the average of a driving behavior of all operators in a given context C, and $f_c$ is the scoring factor of an individual operator for a given context C. Then, the scoring factor can be computed using a function $f_c(o, b) = \Sigma_{e \in E_{o,b,C}} 1 - P(b|c)$ that represents a discounting penalty function assigned to an operator o for executing behaviors of type b in all contexts $$C.P(b/c) = \frac{\sum_{o \in O} |E_{o,b,c}|}{\sum_{o \in O} |E_{o,B,C}|}$$

is the probability of an operator executing a type of behavior in a given context. The computed score for an operator $S_o$ is given in the range (0,1), where a score closer to 1 denotes "good" driving and 0 refers to "poor" driving.

At 412, update one or more farming operation service pairing models based on the rating score $S_O$. In one or more embodiments, the disclosed ratings system for tractor operators may recommend a list of tractor operators for a given tractor service request. If necessary, the system can automatically pair a tractor with an operator or a group of operators for a requested service type. For example, an operator may be recommended or paired with a tractor when each of the component values of the operator's score for respective service type exceeds a predetermined threshold. In other words, an operator's score will be used to rank, select and pair the operator with farming operation service type and tractor upon creation of a booking service request. In one or more embodiments, operators may be rewarded for high scores through "levels," social recognition (e.g., community champion by messaging to friends and family), or other incentives. Operators may follow each other using an application presenting performance information and/or messages associated with specific skillset related to farming operations and/or tractors. In one or more embodiments, the method 400 can be incorporated into a tractor sharing system or application.

In one or more embodiments, the method 400 is implemented in the following modules:

Operator Profiler (OP) module 602. In some embodiments, the operator profiler module 602 structures an operator profile for rating and ranking the tractor operator. The operator profiler module further analyzes a plurality of ratings data associated with the operator, including previous job experience from activity logs such as from tractor sensors (e.g., GPS, accelerometer, etc.), remote (satellite) sensors, etc. In one or more embodiments the operator profiler module 602 also estimates the training, skill and/or experience levels of the operator for one or more of a plurality of service types across one or more farms and tractors based on education, training, and historical farming duties, etc. The operator profiler system may employ one or more custom machine learning models using these features to accurately characterize and profile an operator.

Farm Profiler (FP) module 604. Using the farm specific data, the farm profile module generates a farm profile by blending various models/data such as satellite (i.e., Remote Sensing Data), local (IoT and local Sensing), proprietary weather forecasts (e.g., The Weather Company), soil types, structure and condition, topography, climate, operator input (farm location, crop types, plant dates), etc. Various existing techniques in the prior art (including IBM's Agriculture decision platform offerings) can be used to estimate the soil profile (soil type, moisture level, etc.). The farm profiler module further determines a "farm accessibility index" that may influence the operator performance as operator expertise varies per service type and characteristics of the farm such as location and soil type. Moreover, the method of profiling the farm accounts for the speed of the tractors at a given time, including characterizing the frequency and/or time spent by the operator in a given portion of the farm.

Tractor Profiler (TP) module 606. Using the tractor specific data from the plurality of ratings data such as machinery/tractor profile (including profile of each attachment), historical usage of the tractor in one or more farms by one or more operators, maintenance records of the tractor, feedback/comment received from farmers or other entities associated with a tractor (via text-based feedback, IVR-based feedback, or multimedia such as image/video feedback), and so on. In one embodiment, the tractor profile includes an estimate of a "tractor health index" using machine learning model based on historical utilization data, maintenance records, operator rating or feedback on service performance, service quality assessment, etc. Thus, for the tractor being operated, a Tractor Profile (TP) determined from the tractor model, attached implement and quality of maintenance: TP=<TractorModel, ImplementAttached, Maintenance>.

Inputs to the method 400 include, for example (a non-exhaustive list):

For each tractor service type, an estimated cultivation quality score $Q_s$ for the current farm segment, where $Q_s$ is estimated by comparing cultivation quality metrics M to target values of the metrics.

A given farm service t uses a Tractor Profile TP and Crop Profile CP. Crop Profile (CP) is a function of Farm Profile FP, CropType, and TimePeriod, where time period is the planting information.

A cultivation quality Q is a function of a given service t, operator profile OP, and feedback score. The feedback is related to operators and services received from a farmer or other entities. The feedback data may include (historic) SMS messages, voice messages as received via Interactive Voice Response (IVR) system, or multimedia (e.g., photos/images of cultivated farms sent by farmers, or other entities, drones, or remote sensing). As discussed below, the Feedback Analyzer (FA) module 608 processes, analyzes and generates scores for the operator and services.

Historic estimated cultivation quality scores for a cohort of operators including the given operator.

Weather conditions during cultivation, provided for example by a sensor mounted to the tractor.

A principal output is an operator cultivation quality score $Q_O$=<score, service type>.

Figure 8:
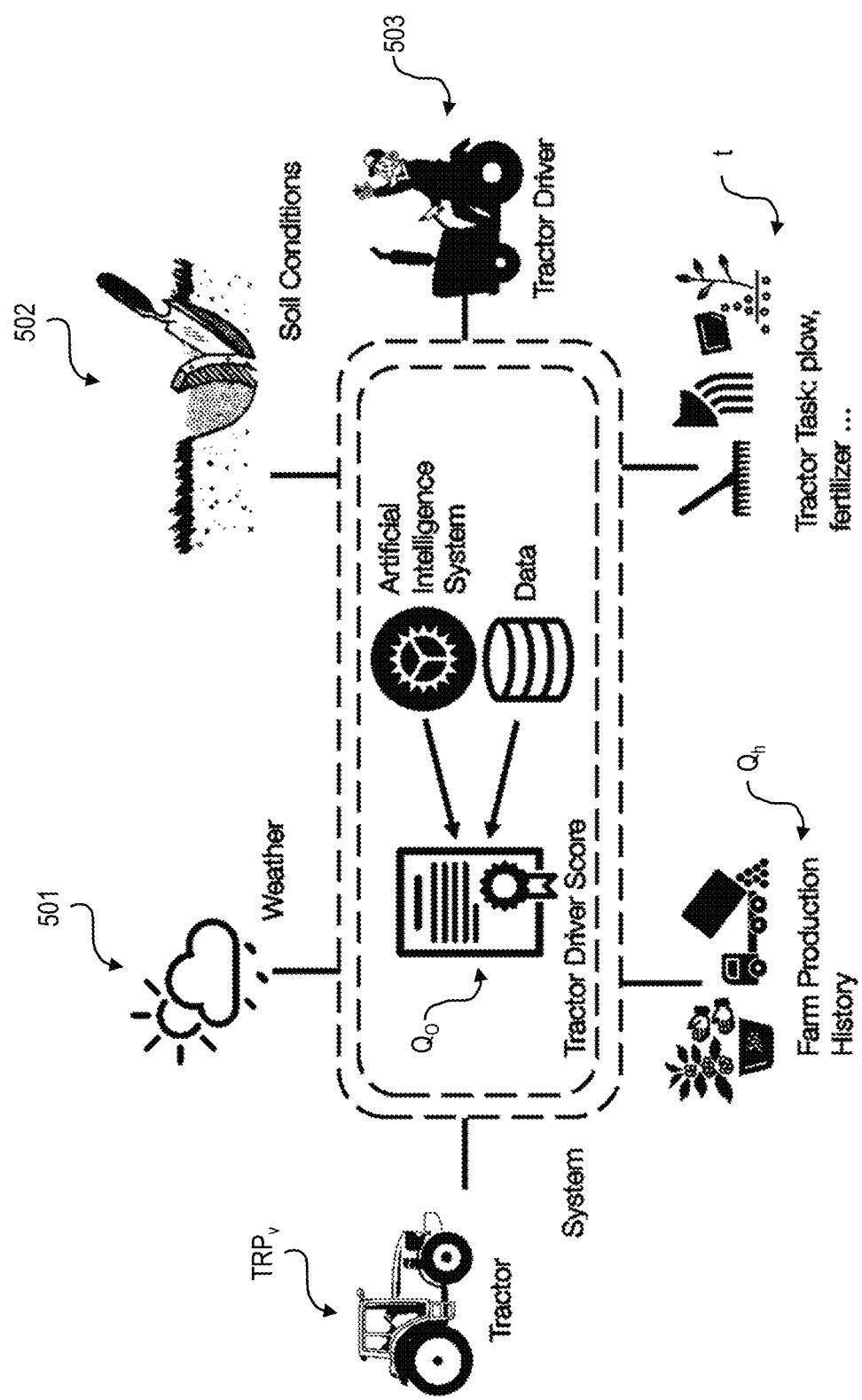
FIG. 8 depicts a schematic illustrating inputs and output of the method of FIG. 6.

FIG. 8 depicts in a schematic selected inputs and outputs for the method 400, including Tractor Profile TP, weather conditions 501, soil conditions 502, tractor driver identity 503, service type t, farm production history $Q_h$, and tractor driver cultivation quality score $Q_O$.

Figure 9:
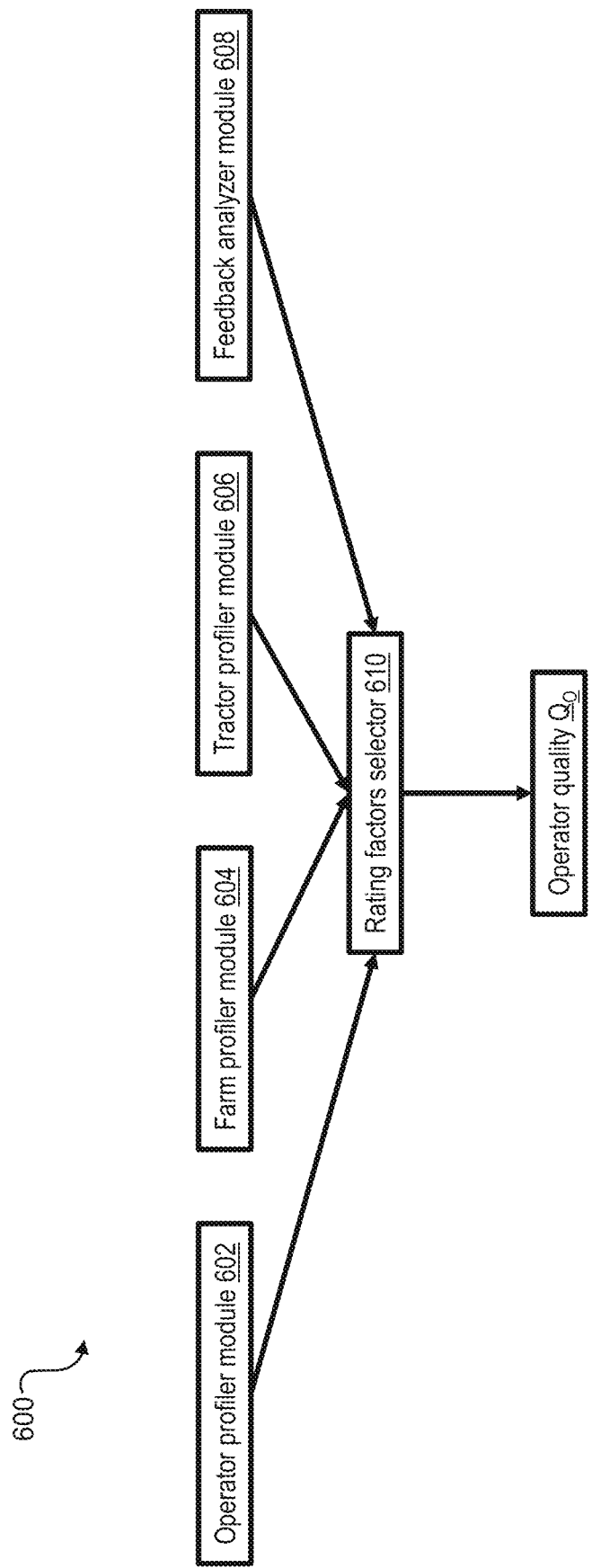
FIG. 9 depicts a schematic illustrating a system of modules for implementing the method of FIG. 6.

FIG. 9 depicts in a schematic modules of a system 600 for implementing the method 400. The system 600 includes an operator profile module 602, a farm profiler module 604, a tractor profiler module 606, a feedback analyzer module 608, and a rating factors selector 610. The rating factors selector 610 weights signals from the modules 602, 604, 606, 608 to produce the operator quality score $Q_O$.

The system also analyzes, using a multi-modal (e.g., text, audio, multimedia) feedback analyzer module, user generated feedback/comments for a tractor, operator, or for the service in general. The Feedback Analyzer (FA) module 608 employs one or more machine learning models such as natural language processing (NLP) for analyzing text feedback, audio/speech synthesis model, or deep learning model analyzing for multimedia data such as video/images/photos. Moreover, various sensor and IoT data (e.g., accelerometer, magnetometer, GPS, camera, etc.) can be used to further determine the operator profile. If necessary, the FA module 608 hierarchically and semantically links and organizes each profile according to, e.g., service type relevance, farm difficulty indexes, farming operation knowledge graphs.

In one or more embodiments, the ratings data, the generated scores and other data and transaction pertaining to establish trusted rating and scoring may be tracked, stored and managed on a blockchain. In particular, a blockchain is used to create a tamper-proof record and one or more smart contracts to track, store and manage data and transactions associated with ratings and verify whether the rating and scoring values (and data used to generate the rating and scoring values) are valid for ratings and scoring tractor operators. The blockchain service invokes the one or more smart contracts associated with expected one or more rating and scoring outputs to help establish the validity of the pairing of operator(s) with tractor(s) according to the ranking of operators and service quality metrics, with stored or dynamically composed consents, as well as to determine the specific selected scoring attributes/features used for ratings and related activities that all parties (farmers, tractor owners, financial institutes, government, etc.) need to comply with tractor service types. If necessary, the smart contract and the consensus protocol in the blockchain rating and scoring service may facilitate rewarding operators (based on their service quality) through incentives such as "levels", social recognition, monetary payment, etc.

Given the discussion thus far, it will be appreciated that, in general terms, an exemplary method, according to an aspect of the invention, includes accessing a source of information regarding farm cultivation techniques; constructing a cultivation knowledge graph by parsing the source of information regarding farm cultivation techniques, using natural language processing; identifying cultivation quality assessment factors by applying machine learning to the cultivation knowledge graph; estimating quality of a farm cultivation task by comparing a stream of real-time data to the cultivation quality assessment factors, wherein the stream of real-time data is related to performance of the farm cultivation task; identifying from the stream of real-time data, using the cultivation knowledge graph, a controllable variable that affects the quality of the farm cultivation task; and improving the quality of the farm cultivation task by facilitating a change in the controllable variable that affects the quality of the farm cultivation task.

In one or more embodiments, in the identifying step, the source of information includes a structured data source. Alternatively, in the identifying step, the source of information includes an unstructured data source that is accessed by a custom web crawler.

In one or more embodiments, parsing the source of information includes parsing for mentions of cultivation tasks and for associated indications of effects on farm yield. In one or more embodiments, the mentions of cultivation tasks are selected from the group consisting of: ploughing, deep ripping, harrowing, and fertilizer spreading.

In one or more embodiments, parsing the source of information further comprises parsing for mentions of general farm conditions related to effects of cultivation tasks. In one or more embodiments, the general farm conditions are selected from the group consisting of: soil type, soil structure, soil moisture, topology, crop planting pattern, historical rainfall, projected rainfall, historical temperature, and projected temperature.

Figure 10:
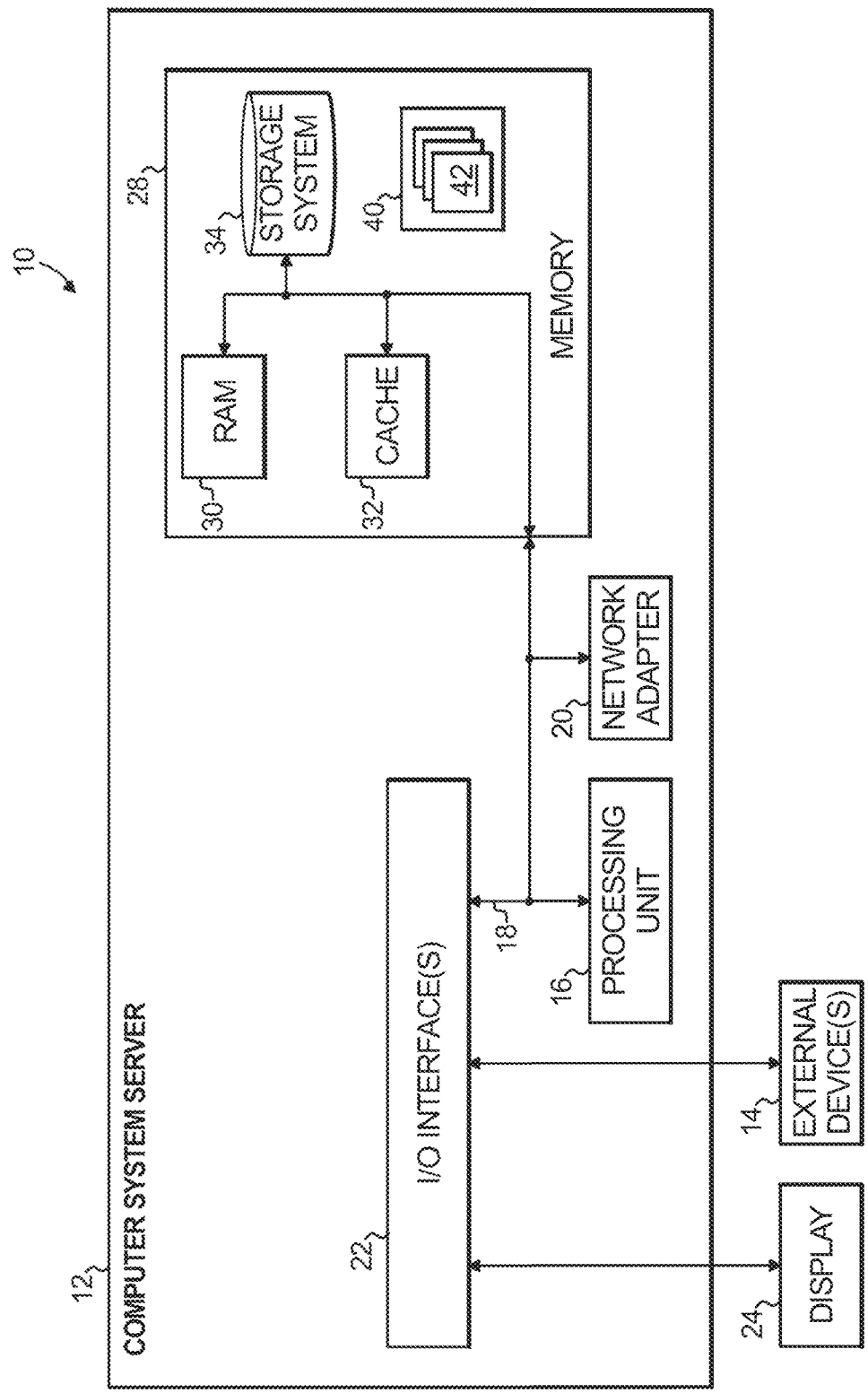
FIG. 10 depicts a schematic illustrating a computer system that may be useful in implementing one or more aspects and/or elements of the invention.

One or more embodiments of the invention, or elements thereof, can be implemented in the form of an apparatus including a memory and at least one processor that is coupled to the memory and operative to facilitate exemplary method steps, or in the form of a non-transitory computer readable medium embodying computer executable instructions which when executed by a computer cause the computer to facilitate exemplary method steps. FIG. 10 depicts a computer system 10 that may be useful in implementing one or more aspects and/or elements of the invention, also representative of a cloud computing node according to an embodiment of the present invention. Referring now to FIG. 10, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 10, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 10) running a server program. It will be understood that such a physical server may or may not include a display and keyboard.

One or more embodiments can be at least partially implemented in the context of a cloud or virtual machine environment, although this is exemplary and non-limiting.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described.

The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for improving farm cultivation quality, comprising:
    accessing an agricultural knowledge source regarding farm cultivation techniques;
    constructing a cultivation knowledge graph by parsing the agricultural knowledge source, using natural language processing;
    identifying cultivation quality assessment factors by applying machine learning to the cultivation knowledge graph;
    estimating quality of a farm cultivation task by comparing a stream of real-time data to the cultivation quality assessment factors, wherein the stream of real-time data is related to performance of the farm cultivation task;
    identifying from the stream of real-time data, using the cultivation knowledge graph, a controllable variable that affects the quality of the farm cultivation task; and
    improving the quality of the farm cultivation task by facilitating a change in the controllable variable that affects the quality of the farm cultivation task.

2. The method of claim 1 wherein the controllable variable is the identity of a tractor operator.

3. The method of claim 1 wherein, in the identifying step, the agricultural knowledge source includes an unstructured data source that is accessed by a custom web crawler.

4. The method of claim 1 wherein parsing the agricultural knowledge source comprises parsing for mentions of cultivation tasks and for associated indications of effects on farm yield.

5. The method of claim 4 wherein the mentions of cultivation tasks are selected from the group consisting of: ploughing, deep ripping, harrowing, fertilizer spreading and other farm cultivation operations by tractors.

6. The method of claim 4 wherein parsing the agricultural knowledge source further comprises parsing for mentions of general farm conditions related to effects of cultivation tasks.

7. The method of claim 6 wherein the general farm conditions are selected from the group consisting of: soil type, soil structure, soil moisture, farm topology, crop planting pattern, historical rainfall, projected rainfall, historical temperature, and projected temperature.

8. The method of claim 1 wherein, in the estimating step, the real-time data is selected from the group consisting of: air temperature, soil temperature, air humidity, soil moisture, soil surface imagery, tractor engine torque, tractor attachment drag force, and tractor attachment running depth.

9. A non-transitory computer readable medium embodying computer executable instructions which when executed by a computer cause the computer to facilitate a method comprising:
  accessing an agricultural knowledge source regarding farm cultivation techniques;
  constructing a cultivation knowledge graph by parsing the agricultural knowledge source, using natural language processing;
  identifying cultivation quality assessment factors by applying machine learning to the cultivation knowledge graph;
  estimating quality of a farm cultivation task by comparing a stream of real-time data to the cultivation quality assessment factors, wherein the stream of real-time data is related to performance of the farm cultivation task;
  identifying from the stream of real-time data, using the cultivation knowledge graph, a controllable variable that affects the quality of the farm cultivation task; and
  improving the quality of the farm cultivation task by facilitating a change in the controllable variable that affects the quality of the farm cultivation task.

10. The computer readable medium of claim 9 wherein, in the identifying step, the agricultural knowledge source includes a structured data source.

11. The computer readable medium of claim 9 wherein, in the identifying step, the agricultural knowledge source includes an unstructured data source that is accessed by a custom web crawler.

12. The computer readable medium of claim 9 wherein parsing the agricultural knowledge source comprises parsing for mentions of cultivation tasks and for associated indications of effects on farm yield.

13. The computer readable medium of claim 12 wherein the mentions of cultivation tasks are selected from the group consisting of: ploughing, deep ripping, harrowing, fertilizer spreading, and other farm cultivation operations by tractors.

14. The computer readable medium of claim 12 wherein parsing the agricultural knowledge source further comprises parsing for mentions of general farm conditions related to effects of cultivation tasks.

15. The computer readable medium of claim 14 wherein the general farm conditions are selected from the group consisting of: soil type, soil structure, soil moisture, farm topology, crop planting pattern, historical rainfall, projected rainfall, historical temperature, and projected temperature.

16. An apparatus comprising:
  a memory embodying computer executable instructions; and
  at least one processor, coupled to the memory, and operative by the computer executable instructions to facilitate a method comprising:
    accessing an agricultural knowledge source regarding farm cultivation techniques;
    constructing a cultivation knowledge graph by parsing the agricultural knowledge source, using natural language processing;
    identifying cultivation quality assessment factors by applying machine learning to the cultivation knowledge graph;
    estimating quality of a farm cultivation task by comparing a stream of real-time data to the cultivation quality assessment factors, wherein the stream of real-time data is related to performance of the farm cultivation task;
    identifying from the stream of real-time data, using the cultivation knowledge graph, a controllable variable that affects the quality of the farm cultivation task; and
    improving the quality of the farm cultivation task by facilitating a change in the controllable variable that affects the quality of the farm cultivation task.

17. The apparatus of claim 16 wherein the mentions of cultivation tasks are selected from the group consisting of: ploughing, deep ripping, harrowing, fertilizer spreading and other farm cultivation operations by tractors.

18. The apparatus of claim 17 wherein parsing the agricultural knowledge source further comprises parsing for mentions of general farm conditions related to effects of cultivation tasks.

19. The apparatus of claim 18 wherein the general farm conditions are selected from the group consisting of: soil type, soil structure, soil moisture, farm topology, crop planting pattern, historical rainfall, projected rainfall, historical temperature, and projected temperature.

20. A method for selecting a tractor operator O for a cultivation task, the method comprising:
  a processor obtaining a cultivation quality score $Q_s$ for a farm segment s;
  the processor determining a tractor service type t for the segment s;
  the processor accessing an agricultural knowledge source regarding farm cultivation techniques;
  the processor constructing a cultivation knowledge graph by parsing the agricultural knowledge source, using natural language processing;
  the processor determining, based on the cultivation knowledge graph, at least one condition c that may influence the cultivation quality $Q_s$ for the tractor service type t;
  the processor determining an operator score $Q_O$ for the operator O, with the operator score including component values $v_t$ for the tractor service type t and $v_c$ for the at least one condition c;
  the processor rating the tractor operator relative to other operators for the service type t and condition c, based on the multi-component operator score $Q_O$; and
  the processor updating a farming operation service pairing model based on the rating score $Q_O$.

* * * * *